(12) United States Patent
Chawla

(10) Patent No.: US 6,847,908 B2
(45) Date of Patent: *Jan. 25, 2005

(54) MACHINE CAPABILITY VERIFICATION AND DIAGNOSTICS (CAP/DIA) SYSTEM, METHOD AND COMPUTER PROGRAM PRODUCT

(75) Inventor: Mohinder Paul Chawla, Wichita, KS (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/738,343

(22) Filed: Dec. 17, 2003

(65) Prior Publication Data

US 2004/0153273 A1 Aug. 5, 2004

Related U.S. Application Data

(63) Continuation of application No. 10/385,342, filed on Mar. 10, 2003, now Pat. No. 6,721,675.
(60) Provisional application No. 60/444,225, filed on Jan. 31, 2003.

(51) Int. Cl.⁷ .......................... G06F 19/00; G01C 17/38
(52) U.S. Cl. .......................... 702/105; 702/94; 702/95; 702/97; 702/168
(58) Field of Search .............................. 702/33–36, 94, 702/95, 105, 168, 182, 183, 97; 33/114, 502; 700/108–110, 159; 73/1.01, 1.79, 1.81

(56) References Cited

U.S. PATENT DOCUMENTS

| 5,035,554 A | * | 7/1991 | Nickols ...................... 409/131 |
| 5,583,443 A | | 12/1996 | McMurty et al. |
| 5,691,909 A | | 11/1997 | Frey et al. |
| 5,796,619 A | | 8/1998 | Wampler |
| 5,903,459 A | | 5/1999 | Greenwood et al. |
| 5,956,251 A | | 9/1999 | Atkinson et al. |
| 5,963,660 A | | 10/1999 | Koontz et al. |
| 6,308,138 B1 | | 10/2001 | Jones et al. |
| 6,434,846 B1 | | 8/2002 | Abbe |
| 6,721,675 B1 | * | 4/2004 | Chawla ...................... 702/105 |

* cited by examiner

*Primary Examiner*—Bryan Bui
(74) *Attorney, Agent, or Firm*—Harness Dickey & Pierce P.L.C.

(57) ABSTRACT

A method for verifying the accuracy of a CNC machine or a CMM. The methodology segregates the measured error into an assignable cause portion and a common cause (or random error) portion. The methodology may be employed to affect the calibration of the machine tool to factor out the mean value of the assignable cause portion. Inherent in this methodology is the ability to diagnose mechanical problems with the CNC machine or CMM that affects the repeatability and accuracy of such machine tools; identify degradation in the performance of such machine tools that is indicative of mechanical failure; and improve the accuracy and repeatability of such machine tools in certain situations.

27 Claims, 5 Drawing Sheets

MACHINE CAPABILITY VERIFICATION AND DIAGNOSTICS (CAP/DIA) SYSTEM, METHOD AND COMPUTER PROGRAM PRODUCT

CROSS-REFERENCE TO RELATED APPLICATIONS

This application is a continuation of U.S. application Ser. No. 10/385,342, filed Mar. 10, 2003 now U.S. Pat. No. 6,721,675, which claims the benefit of U.S. Provisional Application No. 60/444,225, filed Jan. 31, 2003.

FIELD OF THE INVENTION

The present invention generally relates to systems, methods and computer program products for use in conjunction with computer numerically controlled (CNC) machines and coordinate measuring machines (CMM). More particularly, the present invention relates to a method for verifying the accuracy of a CNC machine or a CMM. Inherent in this methodology is the ability to 1) diagnose mechanical problems with the CNC machine or CMM that effect the repeatability and accuracy of such machine tools; 2) identify degradation in the performance of such machine tools that is indicative of mechanical failure; and 3) improve the accuracy and repeatability of such machine tools in certain situations.

BACKGROUND OF THE INVENTION

CNC and CMM machine tools are well known in the art and employed in virtually every field of manufacturing for tasks that include, for example, material cutting, material removal and inspection. Typically, these machine tools have one or more movable elements, such as a work table or tool spindle, with each movable element being movable along one or more orthogonal axes and/or about a rotational axis.

As is well known in the art, the quality of the output from a CNC machine or CMM is a highly complex function that is based in part on the accuracy and repeatability with which the movable elements of the machine tool are movably positioned. Those of even the most basic skill in the art will readily appreciate that the quality of the output is influenced by diverse other factors, such as the accuracy and repeatability of the fixturing that is employed to hold a tool bit or workpiece, but these other factors are outside the scope of the present application and as such, will not be discussed in detail herein.

One way in which accuracy and repeatability may be obtained is through relatively tight tolerancing of the various critical machine tool elements, such as ball screws and ways, that control the movement and/or positioning of a machine tool's movable element. Issues of wear aside, one drawback with this proposition concerns its economics; generally speaking, tolerances may only be tightened to a degree without unreasonable cost penalty, but thereafter substantial costs are incurred so that progression (i.e., the tightening of the tolerances) beyond a point is cost prohibitive. With that in mind, the various critical machine tool elements of most if not all CNC machines and CMM's used in manufacturing are not capable of positioning a machine tool's movable elements in an extremely accurate manner (i.e., on the order of one ten-thousandth of an inch) without some sort of electronic compensation.

Typically, a CNC machine or CMM utilizes a controller that includes two sets of registers for each axis on or about which a movable element may be moved. The first set of registers usually employs a single register for use in compensating for reversal error, which is also known as lost motion or backlash. Reversal error occurs when the movable element is moved in a first direction along or about the axis and thereafter moved in a second direction opposite the first. The second set is a series of registers that correspond to the position of the movable element along or about the axis at various predetermined points. The registers of the second set are intended to correct for errors in the positioning of the movable element at the various predetermined points over its full range of motion along or about the axis.

Various methodologies have been developed to quantify the accuracy and repeatability of a CNC machine or CMM. Generally, these standards have been developed by professional societies, such as the American Society of Mechanical Engineers (ASME), and standards organizations, such as the International Standard Organization (ISO), the VDI/DGQ German Standard Organization, the Association for Manufacturing Technology (AMT) (formerly the National Machine Tool Builders Association (NMTBA)) and the National Institute of Standards and Technology (NIST) (formerly the American National Standard Institute (ANSI)). Software tools that provide information on the formats of such standards are well known and commercially available.

While the details of these methodologies vary somewhat, they share analysis techniques wherein error is quantified as a band or range and wherein the values for the accuracy and repeatability of the machine tool are based on the width of the error band. I have found, however, that values for accuracy and repeatability calculated in this manner are too conservative to be of any meaningful value.

Figure 1:
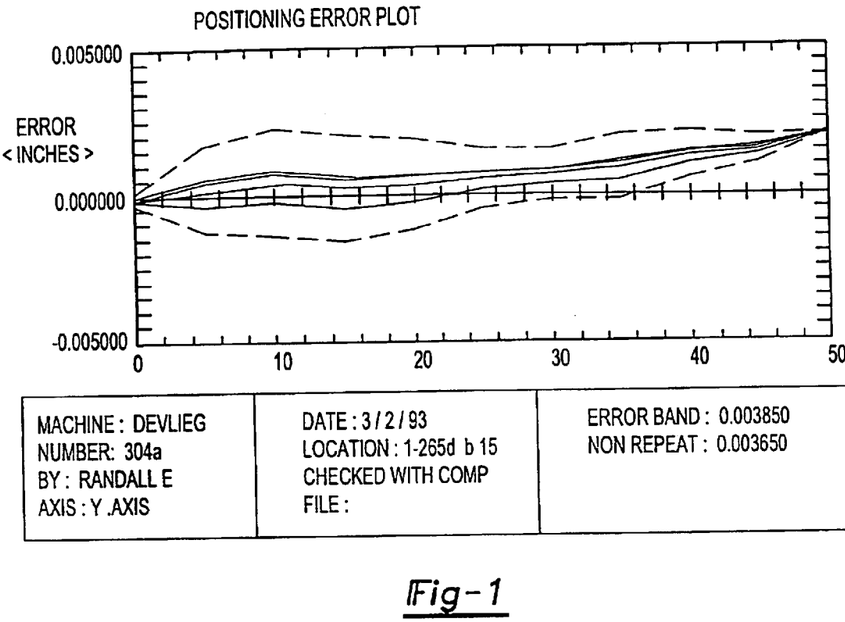
FIG. 1 is a plot illustrating several sets of error data for an axis of a machine tool as well as a conventionally calculated error band about the sets of error data.

The plot illustrated in FIG. 1 shows the results of an accuracy and repeatability analysis (hereinafter capability study) on a CNC machine using one commercially available software tool. In this study, the error band is based on a spread of six standard deviations (i.e., ±3 standard deviations) about the mean of each test point, with the purported accuracy and reliability being based on the maximum width of the error band. In this example, the axis of the machine tool is stated to have an accuracy of 0.003850 inch and a repeatability of 0.003650 inch. Stated another way, the results of this capability study imply that if the movable element of the machine tool were told or commanded to move along the axis to a given point (X), the actual position of the movable element would be within a band of 0.003850 inch (i.e., X±0.001925 inch) and that successive repositioning of the movable element to the given point would place the movable element within a band of 0.003650 inch (i.e., [X±0.001925 inch]±0.001825 inch). Accordingly, one would ordinarily conclude that this axis of the CNC machine would only be useful in manufacturing if the tolerances on the part to be fabricated were larger than about ±0.004 inch.

As the data in the plot clearly illustrates, however, this conclusion is too conservative. Let us assume, for example, that we were to use this CNC machine to fabricate a part that is only two inches in length and that we position the part at the far left of the movable element. Since all of the data points from the capability study fall within an approximately ±0.0005 inch band in this region, the performance of this axis of the CNC machine under these circumstances will be considerably better than ±0.004 inch.

In view of the drawbacks of the known methodologies for quantifying the accuracy and repeatability of a CNC machine or CMM, as well as the common tendency of these methodologies to ignore the calibration process (i.e., the initializing or setting of the first and second registers which is discussed in detail, below), I had found no known method for programming or initializing the first and second sets of registers that produced accurate and repeatable results prior to developing my invention. The methodology most commonly utilized consisted of measuring the error in the positioning of a movable element along or about an axis at each of location designated in the second set of registers. This methodology appears to make use of the mechanic's conventional wisdom wherein the mechanic programs a given register in the second set to correct for measured error at a corresponding location of the movable element. For example, let us assume that the movable element is a rotary spindle that is movable in a generally vertical direction (Z axis) and that a given register in the second set corresponds to a positioning of the spindle at a location 0.50000 inch below a predetermined datum. When the spindle is told or commanded to move 0.50000 inch below the datum, the spindle does not move to that exact position—there is some error (let us assume for this example that the spindle moves to a point 0.50100 inch below the datum). Using his conventional wisdom, the mechanic corrects for the error in positioning by entering a corresponding offset into the given one of the second registers. In the example provided, the offset would be −0.00100 inch.

As this process is repeated for each of the registers in the second set, and as there are often times 50 or more (often times hundreds) registers in the second set for a single axis, the process is rather time consuming and costly (both in terms of the cost of the mechanic's time as well as in machine down-time where it cannot be used in a productive manner). Considering that many CNC machines and CMM's used in manufacturing are of the type having several movable elements that are collectively movable along or about several axes, the amount of time to calibrate a single machine tool can be upwards of several days.

With the machine tool thus calibrated, one would think that the movable elements of the machine tool would be capable of being moved with great accuracy and repeatability. Mechanics, however, have found that this is not the case; rather, they have observed that changes to the values in the registers of the second set, which are often times significant in magnitude, are nearly always necessary on each successive test to eliminate the positioning error at each given point.

From the foregoing, it is apparent that there remains a need in the art for an improved methodology by which a CNC machine or CMM may be calibrated and its accuracy and repeatability more accurately determined.

SUMMARY OF THE INVENTION

In one preferred form, the present invention provides a method for verifying the accuracy of a CNC machine or a CMM. The methodology segregates the measured error into an assignable cause portion and a common cause (or random error) portion. The methodology may be employed to affect the calibration of the machine tool to factor out the mean value of the assignable cause portion. Inherent in this methodology is the ability to diagnose mechanical problems with the CNC machine or CMM that effect the repeatability and accuracy of such machine tools; identify degradation in the performance of such machine tools that is indicative of mechanical failure; and improve the accuracy and repeatability of such machine tools in certain situations.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

Figure 2:
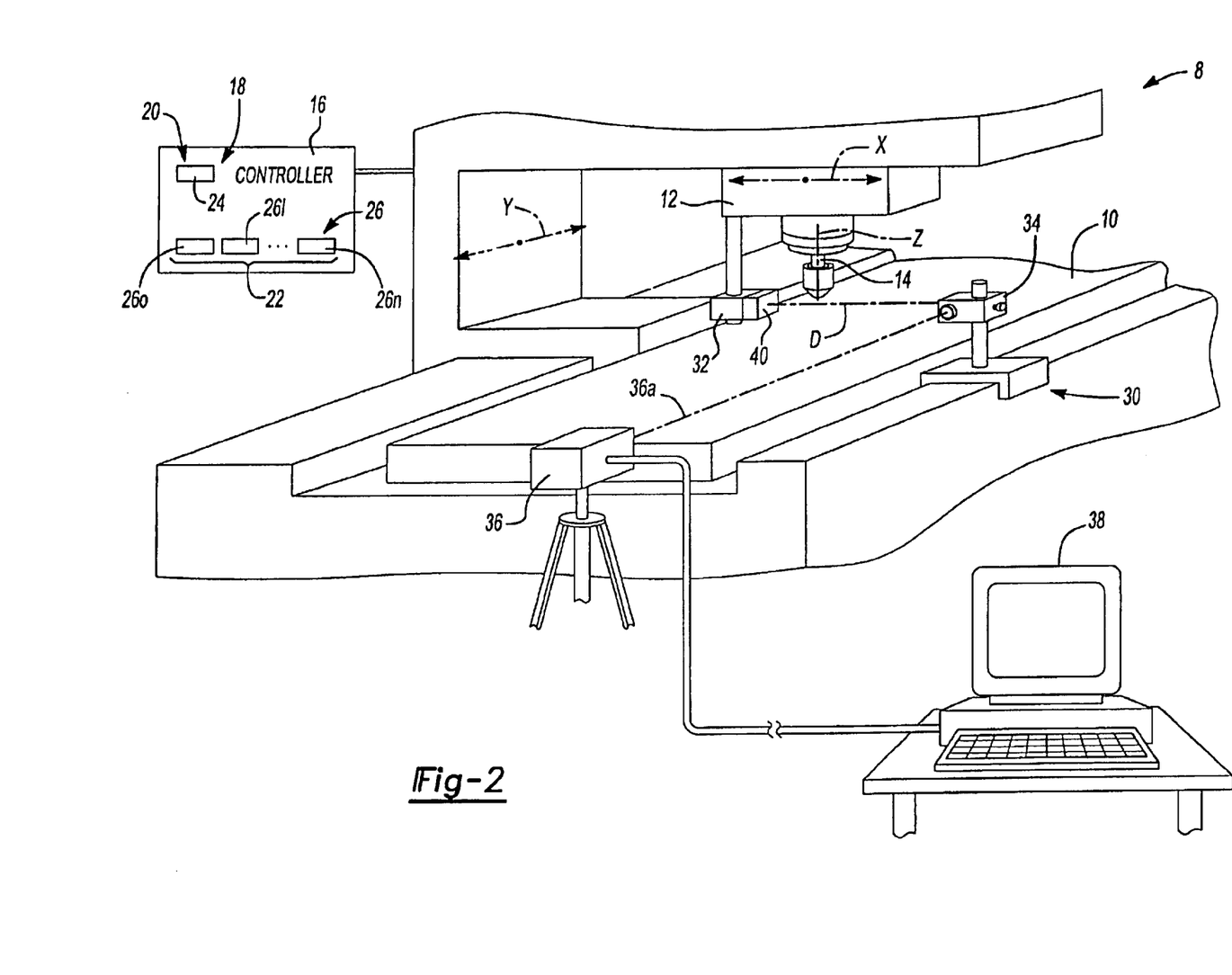
FIG. 2 is a perspective view of an exemplary gauging system for performing the methodology of the present invention, the gauging system being shown in operative association with a conventional CNC machine tool.

With reference to FIG. 2 of the drawings, an exemplary CNC machine is generally indicated by reference numeral 8. The CNC machine 8 is illustrated to be a conventional vertical machining center of the type that is well known in the art. The CNC machine 8 includes a base 10, a first movable element or tool head 12, which is movable in two orthogonal directions relative to the base 10 as identified by axes X and Y, and a second movable element or spindle 14, which is moveable relative to the base 10 along an axis Z, and a controller 16. Although the CNC machine illustrated and described herein is a vertical machining center, it will be understood that the teachings of the present invention have applicability to all types of CNC machine tools, including but not limited to CMM's, horizontal mills, vertical mills, gantry mills, post mills, spar mills, wire electro-discharge machining (EDM) machines, vertical EDM's, water and plasma jets, routers, saws, etc. Furthermore, the particular CNC machine illustrated and described herein includes movable elements that are movable about one or more linear axes, but those skilled in the art will appreciate that the teachings of the present invention are also applicable to movable elements that are movable about a rotary axis.

The controller 16 is conventionally operable for controlling the several drive mechanisms (not shown) that are associated with the tool head 12 and spindle 14, as well as determining the locations of the tool head 12 and spindle 14. More specifically, the controller 16 is operable for controlling the movement of each movable element along its respective axes, as well as continuously determining the location of each movable element along its associated axis or axes. The controller 16 includes a programmable memory 18 having a first set of registers 20 and a second set of registers 22 for each of the axes X, Y and Z. The first and second sets of registers 20 and 22 are utilized to electronically compensate for error in the positioning of the movable elements along or about an associated axis. The first set of registers 20 includes a single register 24 that is employed to compensate for reversal error on an associated axis. The second set of registers 22 includes a plurality of registers $26_x$, with each of the registers $26_x$ being associated with a predetermined point (x) on the associated axis (or about the associated axis in the case where the movable element is rotatable). In the particular example provided, the distance (d) between each register 26 is 0.4096 inch so that register $26_1$ is associated with a distance of 0 inches from a datum along axis X, while registers $26_2$, $26_3$ and $26_n$ are associated with distances 0.8192 inch, 1.2288 inches and (n×0.4096) inches, respectively, from the datum along axis X.

A gauging system 30 is employed in conjunction with a movable element to sense the actual position ($AP_{r,i}$) of the movable element along or about an associated axis [the letter (r) in the subscript is utilized throughout this document to identify a particular run or predetermined distance over which data is collected, whereas the letter (i) is employed to identify a particular location in the predetermined distance]. In the particular example provided, the gauging system 30 is illustrated to include a target 32, a reflector 34, a laser interferometer 36 and a computer system 38, all of which are conventional and well known in the art. The target 32 is configured to be fixedly but removably coupled to a movable element (e.g., the tool head 12) and includes a reflective surface 40. The laser interferometer 38 is positioned in a convenient manner, such as perpendicular to the axis of the machine tool that is to be checked and at a location that is further along the axis that the movable element can travel. The reflector 34 is positioned in a manner that is aligned with the laser interferometer 36 and also along the axis in alignment with the reflective surface 40. As will be apparent to those of ordinary skill in the art, the laser interferometer 36 generates a laser beam 36a that is directed toward the reflector 34. The reflector 34 re-directs the laser beam 36a to the target 32. Thereafter, the reflective surface 40 reflects the laser beam 36a back to reflector 34 and then to the laser interferometer 36. The laser interferometer 36 utilizes the length of time that is necessary for the laser beam 36a to travel the route to and back from the target 32 to determine the position of the target 32 along the axis relative to a predetermined datum D. For purposes of simplifying the explanation herein, the datum D will be set to a value that is associated with the location of the movable element along the axis (e.g., if the controller 16 has moved the movable element to a location that corresponds to a distance of zero (0) inches along the axis, the datum D will be set to zero (0) in this example).

In the example provided, the computer 38, such as a laser interferometer controller, is employed to determine and record the error ($E_{r,i}$) between the actual position ($AP_{r,i}$) of the movable element along the axis (i.e., the position of the target 32 along the axis relative to the datum D as determined by the laser interferometer 36) and the desired position ($DP_{r,i}$) of the movable element along the axis (i.e., a point to which controller 16 has presumably moved the movable element) [i.e., $E_{r,i}=AP_{r,i}-DP_{r,i}$], as well as to analyze the error according to the methodology of the present invention, which is set forth in detail, below.

Figure 3:
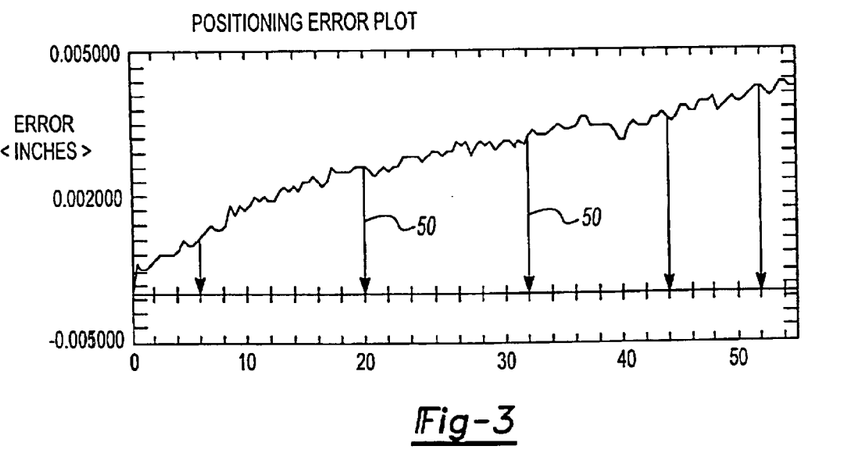
FIG. 3 is a plot of a single set of error data which graphically illustrates a known method (referred to herein as "conventional wisdom") for electronically compensating for error along an axis of a machine tool.

Returning to FIG. 1 and with additional reference to FIG. 3, I have found that the known methods for calibrating the axis of a CNC machine, such as the X axis of CNC machine 8, fail because they attempt to electronically cancel out all error without regard as to where or how the error is being generated. FIG. 3 schematically illustrates the electronic compensation that is typically employed by mechanics when they calibrate a machine tool; each vertical arrow 50 represents an electronic compensation at a given point along or about a particular axis, with the magnitude of the compensation being equal to the measured error in the positioning of the movable element.

In my research, I have discovered that the aforementioned procedure does not produce results that are repeatable or accurate because it 1) attempts to factor out (i.e., eliminate) all variation; and 2) fails to differentiate between common cause variation and assignable cause variation. With regard to the first point, I have found that attempts to factor out or eliminate all variation from a process merely result in driving the process out of statistical control. As such, my methodology does not attempt to eliminate all variation, but rather corrects for the mean value of a certain type of variation.

Figure 4:
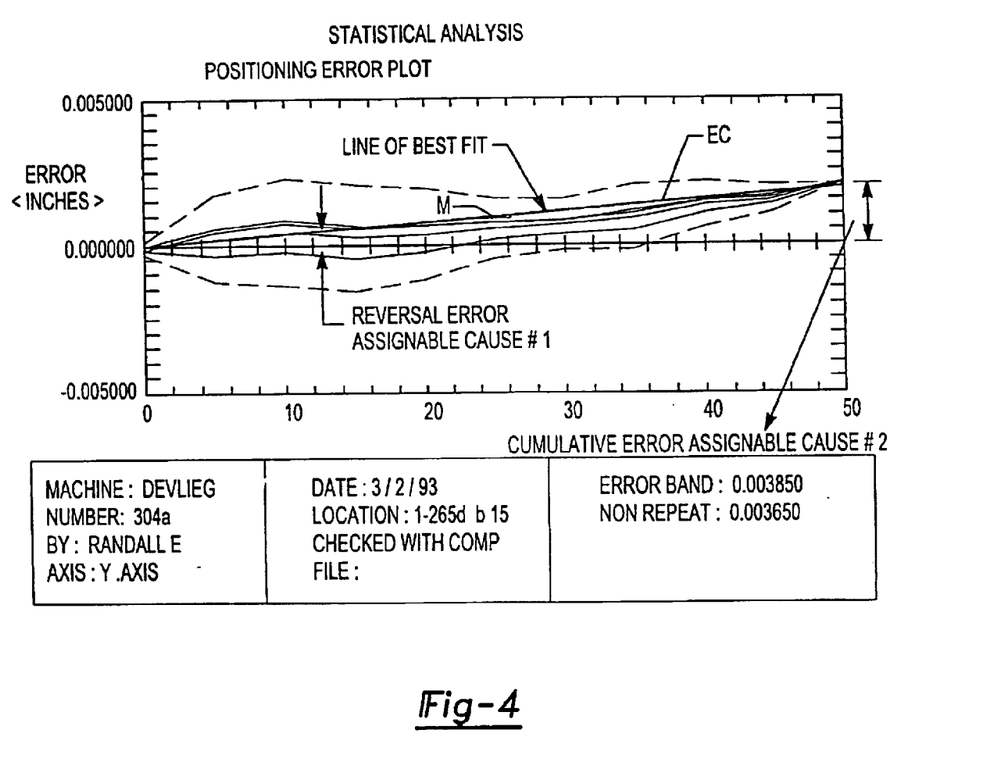
FIG. 4 is a plot similar to that of FIG. 1, but which graphically illustrates two types of assignable cause error.

Regarding the second point, those skilled in the art will appreciate that common cause variation describes random variability that is inherent in the process and affects all values (i.e., the absolute positioning of the movable element), whereas assignable cause variation is due to specific circumstances that can be accounted for, and whereas total variation includes both common cause variation and assignable cause variation. In my analysis and research, I have discovered two sources of assignable cause variation that had not been accounted for in the known methodologies for calibrating CNC machines and CMM's. The first source of assignable cause variation I have termed "reversal error" and the second source of assignable cause variation I have termed "cumulative error". In FIG. 4, reversal error is generally indicated by reference letter $E_{REV}$, while cumulative error is indicated by the line identified by reference letter $E_C$.

Generally speaking, an average value of $E_{REV}$ ($\overline{E}_{REV}$) is utilized in the register 24 to compensate for reversal error, while the slope (m) of the line $E_C$ is utilized to compensate for cumulative error in each of the registers $26_x$.

Figure 5:
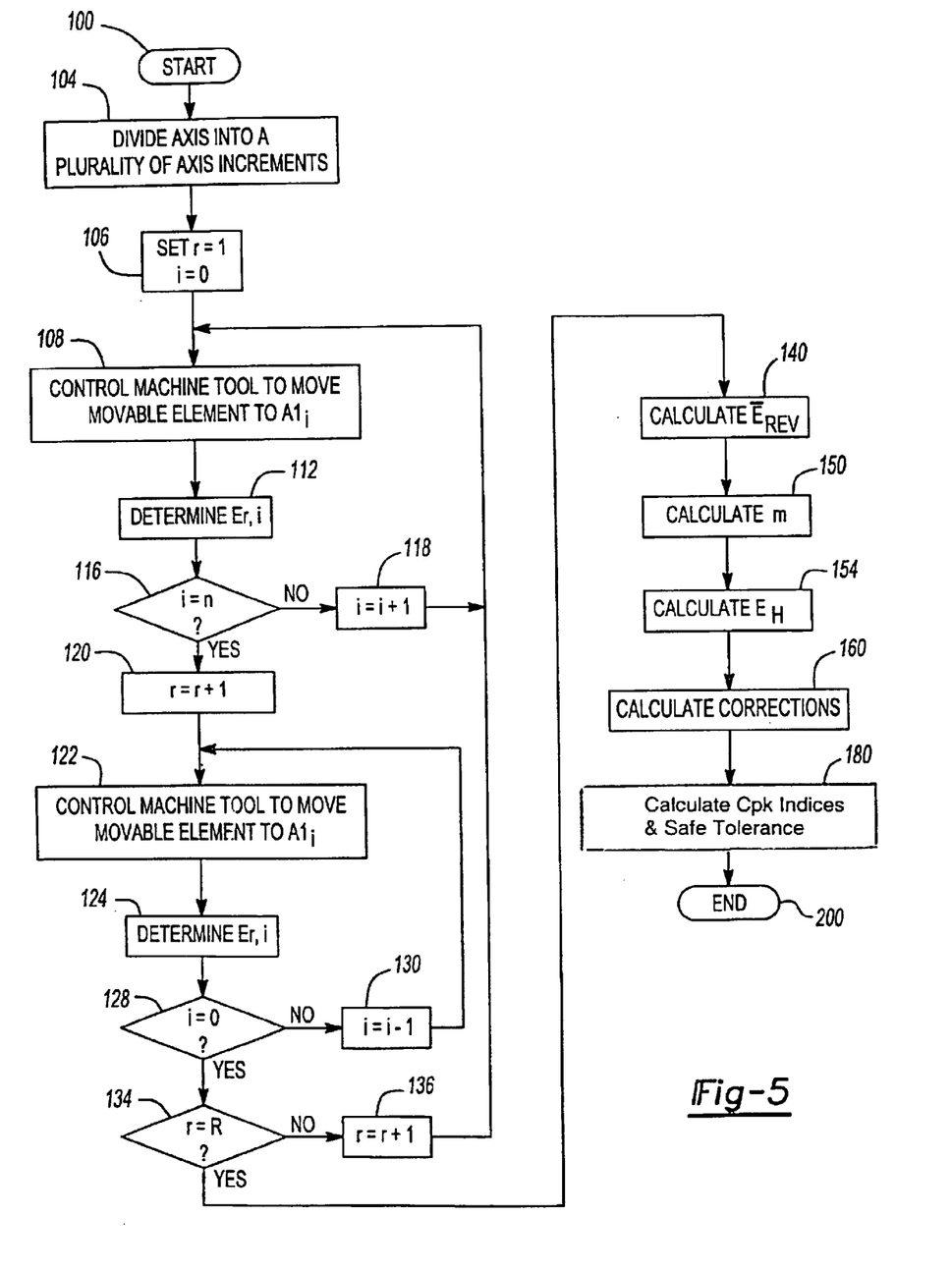
FIG. 5 is a schematic illustration in flowchart form of the methodology of the present invention.

With reference to FIG. 5, the methodology of the present invention will be described in detail. Although the methodology will be described in the context of a linear axis (i.e., axis X on CNC machine 8), those skilled in the art will appreciate that the teachings of the present invention have applicability to an axis about which a movable element may be rotated.

The methodology begins at bubble 100 and progresses to block 104 where a predetermined distance over which the movable element may be moved along or about the axis is selected and segregated into a plurality (N+1) of equally spaced apart axis increment points Al each of which separated by an interval of length or distance L. In the example provided, the distance is a length that corresponds to approximately the full length of travel over which the movable element traverses along the X axis.

As the Central Limit Theorem is employed at a later point in the analysis, the quantity of axis increments Al should be relatively large so as to satisfy generally accepted statistical principles. I suggest a length (L) that would result in approximately 20 to 30 equally spaced-apart axis increment points Al. In the particular example provided, the predetermined distance is 120 inches (i.e., the tool head 12 may be moved 120 inches along the X axis) and as such, I chose a length (L) of 6 inches to provide twenty-one equally spaced axis increment points Al (i.e, axis increments $Al_0$ through $Al_{20}$).

The methodology next progresses to block 106 where the values of (r) and (i) are set to one (1) and zero (0), respectively. Thereafter, the methodology progresses to block 108 wherein the controller 16 of the CNC machine 8 is employed to cause the movable element (i.e., the tool head 12) to move in a first direction to a desired position $DP_{r,i}$ that corresponds to an associated one of the axis increment points $AI_i$. The methodology then proceeds to block 112 where the positioning error $E_{r,i}$ is determined and recorded. As noted above, the positioning error $E_{r,i}$ is the deviation between the desired position $DP_{r,i}$ of the movable element and the actual position $AP_{r,i}$ of the movable element. Thereafter, the methodology proceeds to decision block 116.

In decision block 116 the methodology determines whether the value of (i) is equal to the value of (N) to thereby determine whether error data has been collected for an entire run (r). If the value of (i) is not equal to the value of (N), then the methodology proceeds to block 118 where the value of (i) is incremented by one (i.e., i=i+1). Thereafter, the methodology loops back to block 108 so that the controller 16 may increment the tool head 12 to a location associated with the next axis increment $AI_{i+1}$.

Returning to decision block 116, if the value of (i) is equal to the value of (N), then the methodology proceeds to block 120 wherein the value of (r) is incremented by one (i.e., r=r+1). The methodology then proceeds to block 122.

In block 122, the methodology increments the run (r) (i.e., r=r+1) and the controller 16 of the CNC machine 8 is set or switched to cause the movable element (i.e., the tool head 12) to move in a second direction opposite the first direction to a desired location that corresponds to an associated one of the axis increments $AI_i$. The methodology then proceeds to block 124 where the positioning error $E_{r,i}$ is determined and recorded. Thereafter, the methodology proceeds to decision block 128.

In decision block 128 the methodology determines whether the value of (i) is equal to zero (0) to thereby determine whether error data has been collected for an entire run (r) in the second direction. If the value of (i) is not equal to zero (0), the methodology proceeds to block 130 where the value of (i) is decremented by one (i.e., i=i−1). Thereafter, the methodology loops back to block 122 so that the controller 16 may increment the tool head 12 to a location associated with the next axis increment $AI_{i-1}$.

Returning to decision block 128, if the value of (i) is equal to zero (0), the methodology proceeds to decision block 134 where the methodology determines whether the value of (r) is equal to a predetermined value (R). As the values of $E_{r,i}$ are eventually grouped and averaged as will be described in detail, below, the value of R is an even number that is greater than or equal to four (4). In the example provided, I have assigned R a value of six (6) so that three sets of data are taken with the tool head 12 indexed in the first direction and three sets of data are taken with the tool head 12 indexed in the second direction. If the value of (r) is less than (R), the methodology proceeds to block 136 where the value of (r) is incremented by one (i.e., r=r+1). Thereafter, the methodology loops back to block 108.

Returning to decision block 134, if the value of (r) is equal to (R), the methodology proceeds to block 140 where the value of $\overline{E}_{REV}$ is calculated according to the following formula:

$$\overline{E}_{REV} = \frac{\sum_{i=0}^{N}\left[\frac{(E_{2,i}+E_{4,i}+\ldots+E_{R,i})}{(R/2)} - \frac{(E_{1,i}+E_{3,i}+\ldots+E_{(R-1),i})}{(R/2)}\right]}{(N+1)} \quad (1)$$

Alternately, adjusted error values ($AE_{r,i}$) may be substituted for the values of $E_{r,i}$ in the above equation to permit the methodology to utilize compensations for cumulative error (CEA), reversal error (REA) and zero positioning error (ZPA). The adjusted error value ($AE_{r,i}$) of an associated error value ($E_{r,i}$) where the value of (r) is even is calculated as follows:

$$AE_{r,i} = E_{r,i} - REA + CEA \times i \times L + ZPA \quad (2)$$

whereas the adjusted error value ($AE_{r,i}$) of an associated error value ($E_{r,i}$) where the value of (r) is odd is calculated as follows:

$$AE_{r,i} = E_{r,i} + CEA \times i \times L + ZPA. \quad (3)$$

When adjusted error values are employed, the resulting value of $\overline{E}_{REV}$ is useful in determining the effect that the various compensations (i.e., cumulative error, reversal error and zero positioning error) have on reversal error.

The methodology next progresses to block 150 where at least a portion of the values of $E_{r,i}$ are employed to mathematically develop the line EC (shown in FIG. 4). Since values of $E_{r,i}$ where the value of (r) is even are known to include reversal error (which is calculated above), steps must be taken to factor this error out so as not to improperly affect the calculation of cumulative error.

One method by which reversal error may be isolated from the calculation of cumulative error is to use only those values of $E_{r,i}$ where the value of (r) is odd. The slope (m) of the line $E_C$ is then provided by the equation:

$$m = \frac{2 \times \left[\sum_{i=0}^{N} \frac{(E_{1,i}+E_{3,i}+\ldots+E_{(R-1),i})}{(R/2)}\right]}{(L \times N)} \quad (4)$$

I prefer, however, to utilize the value of $\overline{E}_{REV}$ to effectively remove the average reversal error from those values of $E_{r,i}$ where the value of (r) is even. In this way, the slope (m) of the line $E_C$ is provided by the equation:

$$m = \frac{2 \times \left[\sum_{i=0}^{N} \frac{\{[E_{1,i}+E_{3,i}+\ldots+E_{(R-1),i}] + [(E_{2,i}-\overline{E}_{REV})+(E_{4,i}-\overline{E}_{REV})+\ldots+(E_{R,i}-\overline{E}_{REV})]\}}{(R)}\right]}{(L \times N)} \quad (5)$$

As in the calculation of reversal error, adjusted error values ($AE_{r,i}$) may be substituted in the alternative for the values of $E_{r,i}$ in the above equation to permit the methodology to utilize compensations for cumulative error (CEA), reversal error (REA) and zero positioning error (ZPA). When adjusted error values are employed, the resulting value of the slope (m) is useful in determining the effect that the various compensations (i.e., cumulative error, reversal error and zero positioning error) have on cumulative error.

With the value of the slope (m) having been thus calculated, the methodology proceeds to block 154 where home error ($E_H$) is calculated. Home error describes the error with which the machine tool 8 positions the movable element (e.g., the tool head 12) to a predetermined home position. Home error ($E_H$) is provided by the equation:

$$E_H = \frac{\{[E_{1,0} + E_{3,0} + \ldots + E_{(R-1),0}] + [(E_{2,0} - \overline{E}_{REV}) + (E_{4,0} - \overline{E}_{REV}) + \ldots + (E_{R,0} - \overline{E}_{REV})]\}}{(R)} \quad (6)$$

As noted above for the calculation of reversal error and cumulative error, adjusted error values ($AE_{r,i}$) may be substituted in the alternative for the values of $E_{r,i}$ in the above equation to permit the methodology to utilize compensations for cumulative error (CEA), reversal error (REA) and zero positioning error (ZPA).

Thereafter, the methodology proceeds to block 160 where revised compensations for cumulative error (RCEA), reversal error (RREA) and zero positioning error (RZPE) are calculated as follows: RREA=$\overline{E}_{REV}$; RCEA=m; and RZPE=$E_H$. Values for each of the registers 24 and $26_x$ are calculated and preferably downloaded directly from the computer system 38 to the controller 16. The value of RREA is placed in register 24, while the value ($v_x$) that is placed in a register $26_x$ is calculated as follows:

$$v_x = x \times dx - RCEA - E_H \quad (7)$$

The methodology then proceeds to block 180 where capability indices ($C_{pk}$) for the machine tool are calculated. As those skilled in the art will appreciate, capability indices ($C_{pk}$) are employed as a means for predicting the ability of a process to consistently produce an output to a predefined specification and also function as a problem discovery technique for operations running outside specification limits. Generally, the formula for $C_{pk}$ is provided by the following equation:

$$C_{pk} = \frac{Spec - |\overline{X}|}{3 \times \sigma} \quad (8)$$

where Spec is the maximum tolerance, $\overline{X}$ is the mean value of the data and $\sigma$ is the standard deviation of the data. Preferably, the valued of $\sigma$ is calculated through a well known formula for estimating the standard deviation of the universe of data points:

$$\sigma = S \times \sqrt{\left(1 + \frac{1}{N+1}\right)} \quad (9)$$

where S is the sample standard deviation of the data. Although the universe from which the data is sampled has an unknown shape, the statistics behind the calculation of $C_{pk}$ are sound due to the Central Limit Theorem (which states that irrespective of the shape of the distribution of a universe, the distribution of averages of subgroups drawn from the universe will tend towards normal distribution).

In the example provided, the purchasers or manufacturers of a machine tool would define a tolerance band for cumulative error, repeatability error and position error per unit length and as such, the methodology of the present invention calculates three separate $C_{pk}$ indicies: Cumulative $C_{pk}$, Repeat $C_{pk}$ and Position $C_{pk}$. In the particular example provided, the tolerance band for cumulative error is equal to ±0.001500 inch, the tolerance band for repeatability error is equal to ±0.000500 inch and the tolerance band for positioning error per unit length is equal to ±0.000700 inch/12 inches, which are relatively tight or close tolerances as the machine tool 8 is employed in the fabrication of critical aerospace tooling, components and such. Those skilled in the art will appreciate that the tolerance bands used for another CNC machine or CMM may vary from those that are provided here depending on the type of machine tool and the nature of the work that the machine tool is to perform.

As the registers 24 and $26_x$ have been programmed in a manner that compensates for assignable causes of error to thereby center the process, the values for (Spec) that are used in calculating $C_{pk}$ indices are simply one-half of the associated tolerance band. Accordingly, the Spec values for cumulative ($Spec_{CUM}$), repeatability ($Spec_{REP}$) and position error per unit length ($Spec_{POS}$) are 0.001500 inch, 0.000500 inch and 0.000700 inch/12 inches, respectively.

Relying on the above formula for Cumulative $C_{pk}$ is calculated as follows:

$$\text{Cumulative } C_{pk} = \frac{Spec_{CUM} - |\overline{X}_{CUM}|}{3 \times \sigma_{CUM}} \quad (10)$$

where:

$$\overline{X}_{CUM} = \frac{\sum_{i=0}^{N}\left[\frac{\sum_{r=1}^{R} E_{r,i}}{R}\right]}{(N+1)} \quad (11)$$

$$S_{CUM} = \sqrt{\frac{\sum_{i=0}^{N}\left[\sum_{r=1}^{R}\frac{E_{r,i}}{R} - \overline{X}_{CUM}\right]^2}{N}} \quad (13)$$

and $$\sigma_{CUM} = S_{CUM} \times \sqrt{\left(1 + \frac{1}{N+1}\right)}. \quad (14)$$

It should be noted that the total number of data samples is (N+1) so that the formula for $S_{CUM}$ and or $\sigma_{CUM}$ nonetheless properly calculates standard deviation $\sigma_{EST}$ for cumulative positioning. As noted above for the calculation of reversal error, cumulative error and home error, adjusted error values ($AE_{r,i}$) may be substituted in the alternative for the values of $E_{r,i}$ in the two immediately preceding equations to permit the methodology to utilize compensations for cumulative error (CEA), reversal error (REA) and zero positioning error (ZPA).

Similarly, Repeat $C_{pk}$ may be calculated as follows:

$$\text{Repeat } C_{pk} = \frac{Spec_{REP} - |\overline{X}_{REP}|}{3 \times \sigma_{REP}} \quad (15)$$

where:

$$\overline{X}_{REP} = \frac{\sum_{i=0}^{N}\left[\frac{\sum_{r=2}^{R}|E_{r,i} - E_{(r-1),i}|}{(R-1)}\right]}{(N+1)} \quad (16)$$

$$S_{REP} = \sqrt{\frac{\sum_{i=0}^{N}\left[\sum_{r=1}^{R}\frac{|E_{r,i} - E_{(r-1),i}|}{(R-1)} - \overline{X}_{REP}\right]^2}{N}} \quad (17)$$

and $$\sigma_{REP} = S_{REP} \times \sqrt{\left(1 + \frac{1}{N+1}\right)}. \tag{18}$$

As noted above, adjusted error values ($AE_{r,i}$) may be substituted in the alternative for the values of $E_{r,i}$ in the two immediately preceding equations to permit the methodology to utilize compensations for cumulative error (CEA), reversal error (REA) and zero positioning error (ZPA).

Also similarly, Position $C_{pk}$ may be calculated as follows:

$$\text{Position } C_{pk} = \frac{Spec_{POS} - |\overline{X}_{POS}|}{3 \times \sigma_{POS}} \tag{19}$$

where:

$$\overline{X}_{POS} = \sum_{i=0}^{N} \left[ \frac{\sum_{r=1}^{R} \frac{E_{r,i} + E_{(r+1),i}}{2}}{(N+1)} \right] \tag{20}$$

$$S_{POS} = \sqrt{\frac{\sum_{i=0}^{N} \left[ \sum_{r=1}^{R} \frac{E_{r,i} + E_{(r+1),i}}{2} - \overline{X}_{POS} \right]^2}{N}} \tag{21}$$

and $$\sigma_{POS} = S_{POS} \times \sqrt{\left(1 + \frac{1}{N+1}\right)}. \tag{22}$$

As noted above, adjusted error values ($AE_{r,i}$) may be substituted in the alternative for the values of $E_{r,i}$ in the two immediately preceding equations to permit the methodology to utilize compensations for cumulative error (CEA), reversal error (REA) and zero positioning error (ZPA).

The methodology preferably also calculates "safe" tolerances for cumulative error, repeatability and position per unit length. A workpiece having tolerances that exceed their corresponding safe tolerance may be accurately and repeatably fabricated by the machine tool 8. Generally speaking, a safe tolerance is calculated as follows:

$$ST = \pm(3 \times \sigma + |\overline{X}|) \tag{23}$$

where associated values of $\sigma$ and $\overline{X}$ are employed for a given error {e.g., $\sigma_{CUM}$ and $\overline{X}_{CUM}$ are employed to calculate a safe tolerance for cumulative error ($ST_{CUM}$)}. Thereafter, the methodology progresses to bubble 200 and terminates.

Due to the statistics behind their calculation, the values of ($\overline{E}_{REV}$), (m) and ($E_H$), Capability Indices (Cpks) and Safe Tolerances (ST) are relatively robust in that they may be readily verified in a subsequent capability analysis (i.e., a second capability analysis conducted immediately after a first capability analysis). Accordingly, the values of ($\overline{E}_{REV}$), (m) and ($E_H$), Capability Indices (Cpks) and Safe Tolerances (ST) are important from a historical perspective, as they document the performance of an associated axis of the machine tool. In this regard, performance of a capability analysis at regular intervals using the methodology of the present invention will inform the mechanic of changes in the machine tool that affect its performance but which are otherwise extremely difficult (or even impossible) to identify. Stated another way, by conducting a regularly scheduled capability analysis using the methodology of the present invention and comparing the values of ($\overline{E}_{REV}$), (m) and ($E_H$), Capability Indices (Cpks) and Safe Tolerances (ST) to those obtained in one or more previously conducted capability analysis (using the methodology of the present invention), a mechanic is able to identify very subtle changes in the axis or axes of the machine tool which affect performance but which are otherwise difficult or impossible to trace back to a particular axis or axes.

Figure 6:
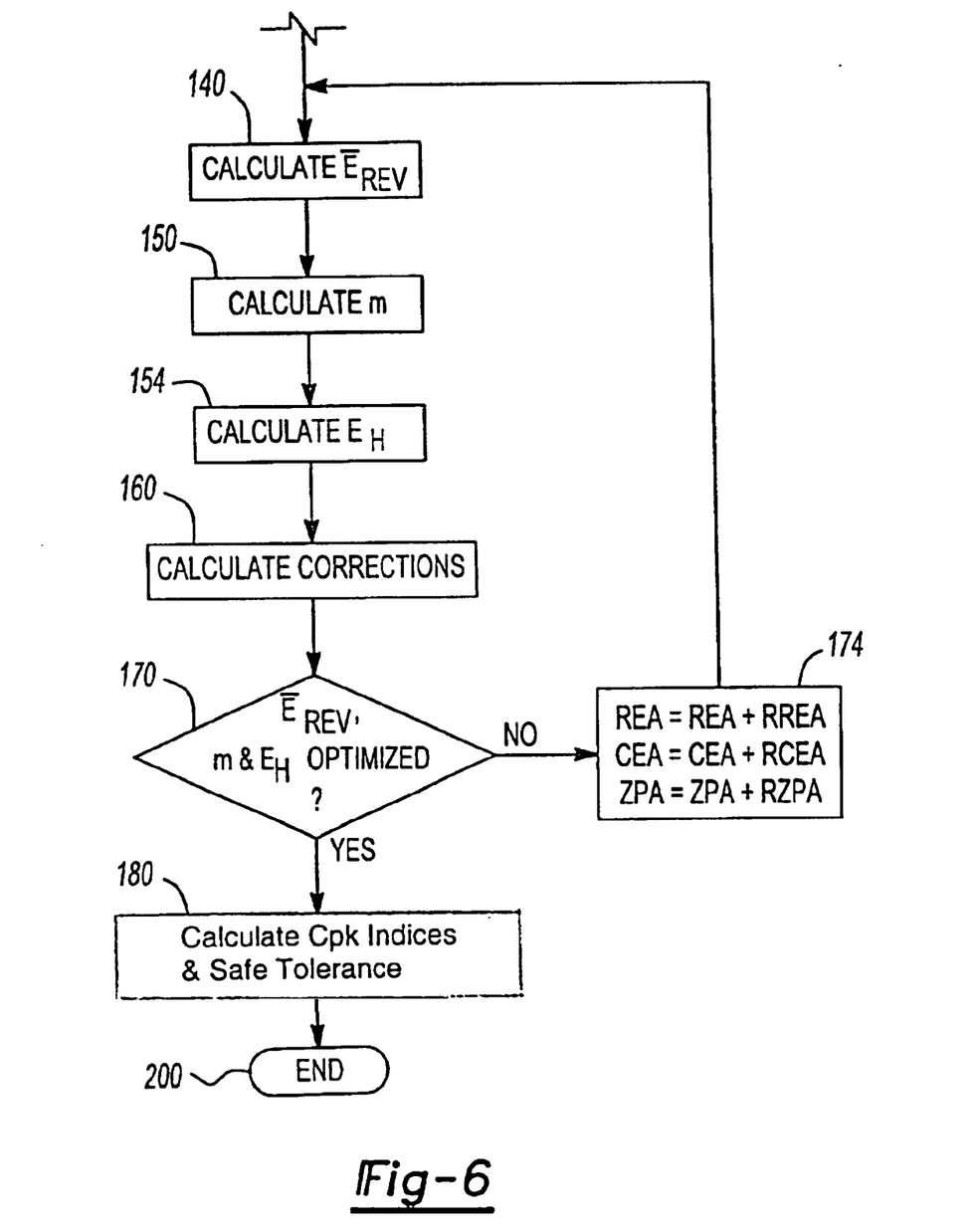
FIG. 6 is a partial schematic illustration in flowchart form of a second embodiment of the methodology of the present invention.

While the methodology of the present invention has been described thus far as calculating the values of ($\overline{E}_{REV}$), (m) and ($E_H$) directly, those skilled in the art will appreciate that the invention, in its broader aspects, may be practiced somewhat differently. For example, the methodology may alternately calculate the values of ($\overline{E}_{REV}$) and (m) and EH in an iterative manner as is illustrated in FIG. 6.

In this embodiment, the methodology is generally similar to the methodology of FIG. 5 except for the addition of decision block 170 and block 174 and the use of adjusted error values ($AE_{r,i}$) is mandatory rather than optional. When the methodology completes block 160, it progresses to decision block 170 to determine whether the values of $\overline{E}_{REV}$, m and $E_H$ have been optimized or reduced to a point where they are less than or equal to a predetermined threshold. In my experience, I have found that the values of $\overline{E}_{REV}$, m and $E_H$ can be reduced to about zero (0), but the predetermined threshold may be higher if desired. Furthermore, the predetermined thresholds associated with the optimization of the values of $\overline{E}_{REV}$, m and $E_H$ may be dissimilar.

Accordingly, if the values of $\overline{E}_{REV}$, m and $E_H$ are not less than or equal to their respective predetermined thresholds, the methodology progresses to block 174 where the values of CEA, REA and ZPA are recalculated as follows:

$$CEA = CEA + RCEA \tag{24}$$

$$REA = REA + RREA \tag{25}$$

$$ZPA = ZPA + RZPA. \tag{26}$$

The methodology then loops back to block 140 so that $\overline{E}_{REV}$, m and $E_H$ may be recalculated with the recalculated values of CEA, REA and ZPA.

Returning to decision block 170, if the values of $\overline{E}_{REV}$, m and $E_H$ are less than or equal to their respective predetermined thresholds, the methodology progresses to block 180 and proceeds as described above.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A method for calibrating a machine having a base, a movable element, which is movable relative to the base in reference to an axis, and a control system for numerically controlling movement of the movable element in reference to the axis along a predetermined distance, the method comprising:

identifying a plurality (N+1) of predetermined spaced-apart positions (i) along the predetermined distance, each of the positions (i) being associated with a desired position ($DP_{r,i}$), the desired position ($DP_{r,i}$) being representative of a desired location of the movable element in the predetermined distance;

moving the movable element to each of the predetermined positions (i) in a first direction and calculating an error ($E_{r,i}$) between the desired position ($DP_{r,i}$) and an actual position ($AP_{r,i}$) of the movable element relative to the base and in reference to the axis at each of the predetermined positions (i);

translating the structure to each of the predetermined positions (i) in a second direction opposite the first direction and calculating an error ($E_{r+1,i}$) between the desired position ($DP_{r+1,i}$) and an actual position ($AP_{r+1,i}$) of the movable element relative to the base and in reference to the axis at each of the predetermined positions (i);

repeating the above two steps a predetermined number (R/2) of times;

identifying at least two sources of assignable cause error; and quantifying the assignable cause error that is attributable to the at least two sources using at least one of the error ($E_{r,i}$) and the error ($E_{r+1,i}$).

2. The method of claim 1, wherein the assignable cause error includes an average cumulative positioning error per unit length.

3. The method of claim 2, wherein the average cumulative positioning error per unit length is based upon an average of the errors ($E_{r,i}$) and ($E_{r+1,i}$) at each of the predetermined positions (i) and an amount by which the movable element is moved relative to the base.

4. The method of claim 2, further comprising calculating a cumulative capability index (Cumulative $C_{pk}$).

5. The method of claim 4, wherein the cumulative capability index (Cumulative $C_{pk}$) is calculated as follows:

$$\text{Cumulative } C_{pk} = \frac{Spec_{CUM} - |\overline{X}_{CUM}|}{3 \times \sigma_{CUM}}$$

where: $Spec_{CUM}$ is a predetermined constant, $$\overline{X}_{CUM} = \frac{\sum_{i=0}^{N}\left[\frac{\sum_{r=1}^{R} E_{r,i}}{R}\right]}{(N+1)}$$

$$S_{CUM} = \sqrt{\frac{\sum_{i=0}^{N}\left[\sum_{r=1}^{R}\frac{E_{r,i}}{R} - \overline{X}_{CUM}\right]^2}{N}}$$

and $$\sigma_{CUM} = S_{CUM} \times \sqrt{\left(1 + \frac{1}{N+1}\right)}.$$

6. The method of claim 5, further comprising calculating a safe tolerance for cumulative error ($ST_{CUM}$) as follows:

$$ST_{CUM} = \pm(3 \times \sigma_{CUM} + |\overline{X}_{CUM}|).$$

7. The method of claim 2, wherein each of the desired positions ($DP_{r,i}$) is spaced out by a predetermined distance (L).

8. The method of claim 7, wherein the average cumulative positioning error per unit length (m) is calculated as follows:

$$m = \frac{2 \times \sum_{i=0}^{N} \frac{\{[E_{1,i} + E_{3,i} + \ldots + E_{(R-1),i}] + [(E_{2,i} - \overline{E}_{REV}) + (E_{4,i} - \overline{E}_{REV}) + \ldots + (E_{R,i} - \overline{E}_{REV})]\}}{(R)}}{(L \times N)}.$$

9. The method of claim 1, wherein the assignable cause error includes an average reversal error ($\overline{E}_{REV}$).

10. The method of claim 9, wherein the average reversal error ($\overline{E}_{REV}$) based on an average of the differentials ($E_{r,i}$) and ($E_{r+1,i}$) at each of the predetermined positions (i) and an amount by which the movable element is moved relative to the base.

11. The method of claim 10, wherein the average reversal error ($\overline{E}_{REV}$) is calculated as follows:

$$\overline{E}_{REV} = \frac{\sum_{i=0}^{N}\left[\frac{(E_{2,i} + E_{4,i} + \ldots + E_{R,i})}{(R/2)} - \frac{(E_{1,i} + E_{3,i} + \ldots + E_{(R-1),i})}{(R/2)}\right]}{(N+1)}.$$

12. The method of claim 10, further comprising calculating a repeat capability index (Repeat $C_{pk}$).

13. The method of claim 12, wherein the repeat capability index (Repeat $C_{pk}$) is calculated as follows:

$$\text{Repeat } C_{pk} = \frac{Spec_{REP} - |\overline{X}_{REP}|}{3 \times \sigma_{REP}}$$

where: $Spec_{REP}$ is a predetermined constant, $$\overline{X}_{REP} = \frac{\sum_{i=0}^{N}\left[\frac{\sum_{r=2}^{R}|E_{r,i} - E_{(r-1),i}|}{(R-1)}\right]}{(N+1)}$$

$$S_{REP} = \sqrt{\frac{\sum_{i=0}^{N}\left[\sum_{r=1}^{R}\frac{|E_{r,i} - E_{(r-1),i}|}{(R-1)} - \overline{X}_{REP}\right]^2}{N}}$$

and $$\sigma_{REP} = S_{REP} \times \sqrt{\left(1 + \frac{1}{N+1}\right)}.$$

14. The method of claim 13, further comprising calculating a safe tolerance for repeatability error ($ST_{REP}$) as follows:

$$ST_{REP} = \pm(3 \times \sigma_{REP} + |\overline{X}_{REP}|).$$

15. The method of claim 1, wherein the assignable cause error includes home positioning error.

16. An apparatus for calibrating a machine having a base, a movable element that is movable relative to the base in reference to an axis, and a control system for numerically controlling movement of the movable element along the axis, the apparatus comprising:

means for calculating an error ($E_{r,i}$) between a desired position ($DP_{r,i}$) and an actual position ($AP_{r,i}$) of the movable element relative to the base and in reference to the axis at each of a plurality of predetermined positions (i) when the movable element is moved relative to the base in a first direction;

means for calculating an error ($E_{r,i}$) between a desired position ($DP_{r,i}$) and an actual position ($AP_{r,i}$) of the movable element relative to the base and in reference to the axis at each of the predetermined positions (i); and means for quantifying an assignable cause error that is attributable to at least two sources, the quantifying means employing at least one of the error ($E_{r,i}$) and the error ($E_{r+1,i}$) to quantify the assignable cause error attributable to each of the at least two sources.

17. A method for calibrating a machine having a base, a movable element, which is movable relative to the base in reference to an axis, and a control system for numerically controlling movement of the movable element in reference to the axis along a predetermined distance, the method comprising:

identifying a plurality (N+1) of predetermined spaced-apart positions (i) along the predetermined distance, each of the positions (i) being associated with a desired position ($DP_{r,i}$), the desired position ($DP_{r,i}$) being representative of a desired location of the movable element in the predetermined distance;

moving the movable element to each of the predetermined positions (i) in a first direction and calculating an error ($E_{r,i}$) between the desired position ($DP_{r,i}$) and an actual position ($AP_{r,i}$) of the movable element relative to the base and in reference to the axis at each of the predetermined positions (i);

translating the structure to each of the predetermined positions (i) in a second direction opposite the first direction and calculating error ($E_{r+1,i}$) between the desired position ($DP_{r+1,i}$) and an actual position ($AP_{r+1,i}$) of the movable element relative to the base and in reference to the axis at each of the predetermined positions (i);

repeating the above two steps a predetermined number (R/2) of times; and determining an average cumulative positioning error per unit length (m) based upon an average of the differentials ($E_{r,i}$) and ($E_{r+1,i}$) at each of the predetermined positions (i) and an amount by which the movable element is moved relative to the base.

18. The method of claim 17, further comprising the step of determining an average reversal error ($\overline{E}_{REV}$) based on an average of the differentials ($E_{r,i}$) and ($E_{r+1,i}$) at each of the predetermined positions (i) and an amount by which the movable element is moved relative to the base.

19. The method of claim 18, wherein the average reversal error ($\overline{E}_{REV}$) is calculated as follows:

$$\overline{E}_{REV} = \frac{\sum_{i=0}^{N}\left[\frac{(E_{2,i}+E_{4,i}+\ldots+E_{R,i})}{(R/2)} - \frac{(E_{1,i}+E_{3,i}+\ldots+E_{(R-1),i})}{(R/2)}\right]}{(N+1)}.$$

20. The method of claim 19, further comprising calculating a repeat capability index.

21. The method of claim 20, further comprising calculating a safe tolerance for repeatability error.

22. The method of claim 17, further comprising calculating a cumulative capability index.

23. The method of claim 22, further comprising calculating a safe tolerance for cumulative error.

24. The method of claim 17, further comprising the step of calculating a home error ($E_H$).

25. The method of claim 24, wherein the home error ($E_H$) is calculated as follows:

$$E_H = \frac{\{[E_{1,0}+E_{3,0}+\ldots+E_{(R-1),0}]+[(E_{2,0}-\overline{E}_{REV})+(E_{4,0}-\overline{E}_{REV})+\ldots+(E_{R,0}-\overline{E}_{REV})]\}}{(R)}.$$

26. The method of claim 17, further comprising calculating a position capability index.

27. The method of claim 26, further comprising calculating a safe tolerance for position error ($ST_{POS}$).

* * * * *